United States Patent [19]

Hailey

[11] 4,419,161
[45] Dec. 6, 1983

[54] METHOD OF PRODUCING COMPOSITE CERAMIC ARTICLES

[75] Inventor: Laurence N. Hailey, Niagara Falls, N.Y.

[73] Assignee: Kennecott Corporation, Cleveland, Ohio

[21] Appl. No.: 332,080

[22] Filed: Dec. 18, 1981

Related U.S. Application Data

[63] Continuation-in-part of Ser. No. 218,982, Dec. 22, 1980, abandoned.

[51] Int. Cl.$^3$ .................. B32B 31/00; C04B 39/12
[52] U.S. Cl. ...................... 156/89; 501/87; 501/88; 501/92; 501/91; 501/96
[58] Field of Search ............... 156/89, 155; 501/87, 501/88, 92, 91, 96

[56] References Cited

U.S. PATENT DOCUMENTS 2,806,800  9/1957  Glaser .................... 501/92
3,657,592  4/1972  Kellar .................... 156/335

Primary Examiner—Caleb Weston
Attorney, Agent, or Firm—R. Lawrence Sahr

[57] ABSTRACT

In accord with the present invention, a composite ceramic article may be produced by joining separate components of ceramic materials with a cement or brazing compound of finely-divided metal borides, such as $Mo_2B_5$, $MoB_2$, $TiB_2$, $GeB_2$, $ZrB_2$, $SmB_6$, $NbB_2$, $HfB$, $VB_2$, $WB_2$ or $TaB_2$. A particularly useful metal boride for use with silicon carbide is $Mo_2B_5$.

If the metal carbide parts or components to be joined are sintered, the metal boride cement is selected to have a melting point within 150° C., but less than the sintering temperature of the metal carbide.

If the metal carbide parts or components to be joined are unsintered, or an unsintered component is to be joined to a sintered component, the metal boride cement is selected to have a melting point slightly higher than the sintering temperature of the metal carbide components to be joined.

16 Claims, No Drawings

METHOD OF PRODUCING COMPOSITE CERAMIC ARTICLES

CROSS-REFERENCE TO RELATED APPLICATION

This is a continuation-in-part of copending application Ser. No. 218,982, filed Dec. 22, 1980, now abandoned.

BACKGROUND OF THE INVENTION

The present invention relates to the joining of individual ceramic components, or pieces, to form a composite ceramic article. Although the present invention will be specifically discussed in regard to articles assembled from components of sintered, or unsintered, silicon carbide, it will be understood that other carbide materials, such as titanium or tungsten carbide or mixtures, may be utilized as the ceramic components.

Silicon carbide has long been known for its hardness, strength, and excellent resistance to oxidation and corrosion. Silicon carbide has a low coefficient of expansion, good heat transfer properties, and maintains high strength at elevated temperatures. In recent years, the art of producing high-density silicon carbide materials by sintering silicon carbide powders under substantially pressureless conditions has been developed. High-density silicon carbide materials find utility in the fabrication of components for turbines, heat exchange units, pumps and other equipment or tools that are exposed to severe corrosion or wear, especially in operations carried out at high temperatures.

Ceramic articles of components thereof may be formed or shaped by various casting or molding processes. Suitable forming or shaping processes which are well known in the art, for example, cold pressing, isostatic forming, slip casting, extrusion, injection or transfer molding or tape casting, may be utilized to initially form the components of the present invention.

In many forming or shaping operations, it is desirable, or more economical, to form one component by one molding method and another or other components by different molding methods and subsequently joining the components to form a composite article. In some cases, it is not feasible to case or mold the entire article as a unit. In such cases, the components are separately formed and subsequently joined to produce composite articles of complex shapes or compositions.

The present invention provides a method of joining formed components which may be entirely of unsintered metal carbides, or green bodies, entirely of sintered metal carbides, or mixtures of sintered and unsintered metal carbides.

Silicon carbide bodies having high density and high strength are produced by sintering particulate silicon carbide in the form of the article. More recently, the art of pressureless sintering of silicon carbide has been applied to full-scale commercial processes. In such processes, a green body of unsintered silicon carbide is formed by molding or shaping a mixture of particulate silicon carbide, excess carbon and a sintering aid. The formed green body is sintered under substantially pressureless conditions at temperatures between about 2050° and about 2100° C. for a period of from about 20 minutes to about 30 minutes to produce a sintered silicon carbide article. The sintering process produces a product having the molded shape, but with slightly smaller dimensions, because of shrinking during the sintering process. Various compounds of boron or beryllium have been found useful as sintering or densification aids. Such aids are usually added to the ceramic material powder in amounts ranging between about 0.3 and about 5.0 percent by weight of boron or beryllium, based on the weight of the mixture. The sintering aid may be in the form of elemental boron or beryllium or in the form of boron- or beryllium-containing compounds. Boron is the preferred additive for reasons of handling and performance. Boron is commonly utilized in the form of boron carbide. Examples of boron-containing silicon carbide powders and methods of producing sintered articles are described in U.S. Pat. application Ser. No. 584,226, filed June 5, 1975, now U.S. Pat. No. 4,312,954 and U.S. Pat. Nos. 4,179,299 and 4,124,667, the teachings of which are hereby incorporated herein by reference. With respect to beryllium, see U.S. Pat. No. 4,172,109.

The present invention provides a method of utilizing sintered or unsintered silicon carbide bodies as components of articles having complex shapes, or as components of composite articles having surfaces or parts which vary in chemical or physical properties.

GENERAL DESCRIPTION OF THE INVENTION

In accord with the present invention, a composite ceramic article may be produced by joining separate components of ceramic materials with a cement or brazing compound of finely-divided metal borides, such as $Mo_2B_5$, $MoB_2$, $TiB_2$, $GeB_2$, $ZrB_2$, $SmB_6$, $NbB_2$, $HfB$, $VB_2$, $WB_2$ or $TaB_2$. A particularly useful metal boride is $Mo_2B_5$.

If the metal carbide parts or components to be joined are sintered, the metal boride cement is selected to have a melting point within 150° C., but less than the sintering temperature of the metal carbide. For example, if the components to be joined are of sintered silicon carbide, the metal boride cement is selected to have a melting point within 150° C., but less than the sintering temperature of silicon carbide, about 2150° C.

If the metal carbide parts or components to be joined are unsintered, or an unsintered component is to be joined to a sintered component, the metal boride cement is selected to have a melting point slightly higher than the sintering temperature of the metal carbide components to be joined.

The metal boride cements of the present invention may be formed in situ by utilizing a mixture of stoichiometric amounts of finely-divided metal and boron, by utilizing a metal hydride and boron, or by utilizing a mixture of a metal oxide, carbon or carbon source and boron.

Borides of molybdenum are preferred for use as the metal boride cement, and in particular $Mo_2B_5$ is preferred for use with sintered silicon carbide. Molybdenum borides are compatible with sintered silicon carbide with respect to chemistry and melting point, and $Mo_2B_5$ is particularly compatible with sintered alpha silicon carbide, with respect to coefficients of thermal expansion. Over the same temperature ranges, the average coefficients of thermal expansion (CTE) of sintered silicon carbide and $Mo_2B_5$ are as follows:

Sintered Alpha Silicon Carbide: $4.32 \times 10^{-6}$ cm/cm-°C.
$Mo_2B_5$: $5.0 \times 10^{-6}$ cm/cm-°C.

The CTE for beta silicon carbide is about 1 to 2 percent less than that for alpha silicon carbide. By way of contrast, the CTE for $MoB_2$ is $7.74 \times 10^{-6}$ cm/cm-°C.

Theoretical stress analysis shows that in the most rigorous case, the coefficient of thermal expansion for a cement for use with sintered alpha or beta (or mixed phase) silicon carbide should be between $2.5 \times 10^{-6}$ and $6.5 \times 10^{-6}$ cm/cm-°C. This confirms that $Mo_2B_5$ is an excellent bonding material for sintered silicon carbide.

The melting points of the metal boride cements of the present invention may be lowered by the addition of carbon or by mixing lower melting metal borides that form eutectic solutions having lower melting points.

The present cements may be utilized to produce a composite article by placing the metal boride in a powdered form on at least one of the surfaces of the components to be joined; preferably, the metal boride cement is mixed with a temporary binder to better disperse the cement or cement components and hold the components together and aligned prior to furnacing. Examples of suitable binders are waxes, such as paraffin, mineral and vegetable waxes, thermoplastic resins, such as styrenes, acrylics, ethyl cellulose, ABS (acrylonitrile-butadiene-styrene), hydroxypropyl cellulose, high and low density polyethylene, oxidized polyethylene, cellulose acetate, nylon, ethylene acrylic acid copolymer, cellulose acetate butyrate, polystyrenes, polybutylene, polysulfone, polyethylene glycol and polyethylene oxide, gums, such as gum tragacanth, cellulose-containing materials, such as methyl cellulose, or, in some applications, thermosetting resins, such as phenolics. The components to be joined are pressed together and the excess cement, or cement and binder, removed. Suitably, the components are clamped, and, if appropriate, the temporary binder dried or allowed to set. The composite is subsequently fired.

When the components to be joined are entirely of unsintered metal carbide material, or include at least one unsintered metal carbide component, the brazing or cementing step is carried out under conditions which sinter the metal carbide component.

When the components to be joined are sintered metal carbide materials, the brazing or cementing is carried out at firing temperatures slightly lower than the sintering temperature of the metal carbide material. Generally, temperatures within about 150° C. of the sintering temperature, applied for a period of about 20 to about 30 minutes, are aptly suited to use.

The firing of the metal carbide components is preferably carried out under inert conditions. As used herein, the term "inert conditions" means conditions under which neither the metal carbide materials nor the metal boride cement are chemically reactive with each other or with the firing atmosphere to any substantial extent. A vacuum is a useful inert atmosphere, and atmospheres of inert gases, such as argon, are eminently useful.

Sintered silicon carbide is a preferred ceramic material. The sintered silicon carbide may be alpha or beta phase. Such ceramic materials may be comprised substantially entirely, e.g., 95 percent or more by weight, silicon carbide of the alpha phase, or may contain mixtures of the various forms of silicon carbide. Other ceramic materials, such as titanium carbide or tungsten carbide, may be utilized to produce composite articles having surfaces or parts which have varying physical or chemical properties, depending upon the requirements or use of the composite article.

DETAILED DESCRIPTION OF THE INVENTION AND PREFERRED EMBODIMENTS

The present invention relates to a cement for joining ceramic materials. The cement is comprised of metal borides, such as $Mo_2B_5$, $MoB_2$, $TiB_2$, $GeB_2$, $ZrB_2$, $SmB_6$, $NbB_2$, $HfB$, $VB_2$, $TaB_2$ or mixtures thereof. Most preferred and best adapted to use singly is $Mo_2B_5$. The most preferred metal carbide ceramic material is SiC.

Preferably, at least one of the faces to be joined is coated, or buttered, with a temporary binder mixture comprised of the metal boride in a temporary binder. The binder mixture is suitably applied as a coating or layer between about 0.08 mm and about 0.16 mm thick. The metal boride content of the mixture preferably ranges from about 60 to about 90 percent by weight. The amount of the metal boride may be varied to obtain a spreadable or pliable mixture. Usually, mixtures containing over about 80 percent by weight metal boride are not sufficiently pliable to obtain the required spreading or layering. Mixtures containing less than about 60 percent by weight metal boride do not consistently produce a desired mechanically strong joint. Useful temporary binders are organic pyrolizable materials, such as waxes, thermosetting resins, gums, polyvinyl alcohols, methyl cellulose, thermoplastic resins or mixtures thereof. A relatively inexpensive temporary binder that is particularly useful in methyl cellulose. Usually, the temporary binder is selected to leave little, less than about 4.0 percent, carbon char, an exception being if the boride cement is to be formed in situ using a metal oxide starting material, a boron source and a carbon source; in such case, phenolic resins are aptly suited to use as a temporary binder which also supplies the carbon source material.

After coating, the faces of the components to be joined are firmly pressed together, and the excess temproary binder mixture removed from around the joined area. Generally, after pressing, the components to be joined are spaced with between about 0.5 micron and about 1.0 micron of cement therebetween. It is preferred that the components be clamped or maintained in the joined position by other suitable retaining means. If appropriate, the temporary binder may then be dried or cured while the components are maintained in a joined position. Subsequently, the retaining means may be removed and the components fired to produce the desired composite article.

Although the present metal boride cement functions to provide a physical bond between the components, a thin layer of metal borides or mixtures thereof, having a melting point within about 150° C., and more preferably, within about 50° C., of the sintering temperature of the metal carbide components to be joined, enters into a secondary sintering reaction with the components, forming a solid solution layer along each interface. The completed joint in cross section is in the form of a layer of the metal boride sandwiched between two thinner layers of a solid solution of the metal boride and the metal carbide. The cements of the present invention also flow outward and wick around the joint to form a smooth, thin coating of cement in solid solution with the metal carbide. It is postulated that the wicking effect evidences an exceptionally good wetting of the metal carbide components by the present cements and provides an additionally strengthened joint.

One would expect, in joining two components of unsintered silicon carbide that a cement of unsintered silicon carbide containing a carbon source and a sintering aid would appropriately function as a cement; however, such joints are not mechanically solid and are subject to breakage when exposed to mechanical shock.

The following examples are illustrative and are not to be interpreted as limiting of the present invention. Unless otherwise noted, parts are in parts by weight, and temperatures are in degrees Celsius.

EXAMPLE I

UNSINTERED COMPONENTS

Two rods, 1.27 cm in diameter, of unsintered silicon carbide, were formed as green bodies. One end of each rod was coated with about 1.6 mm of a temporary binding mixture containing about 80 percent by weight $Mo_2B_5$ in a matrix of methyl cellulose in an aqueous slurry. The rod ends were then pushed together with sufficient force to extrude a portion of the mixture therebetween, clamped in position, and the excess $Mo_2B_5$-methyl cellulose mixture removed. The rods were then heated to remove the water from the temporary binder and sbusequently fired in an atmosphere of argon at a temperature of about 2150° for a period of about 25 minutes to sinter the silicon carbide rods.

Upon cooling, the joined rods were tested by mechanical shock and found to be structurally strong composite.

EXAMPLE II

SINTERED COMPONENTS

Two rods, 1.27 cm in diameter, of sintered silicon carbide, were coated with a similar temporary binding mixture in the same manner as in Example I. The rods were fired in an atmosphere of argon at a temperature of about 2100° for a period of about 25 minutes. The cooled joined rods were tested by mechanical shock and found to be formed into a structurally strong composite.

EXAMPLE III

SINTERED AND UNSINTERED COMPONENTS

One rod, 2.54 cm in diameter, of unsintered silicon carbide, and one rod, 1.27 cm in diameter, of sintered silicon carbide, were coated with a similar temporary binding mixture in the same manner described in Example I. The rods were then fired in an argon atmosphere at a temperature of about 2150° for a period of about 25 minutes. The resultant composite sintered product was tested by mechanical shock and found to be structurally strong.

EXAMPLE IV

IN SITU FORMATION OF CEMENT

Two rods, 1.27 cm in diameter, of sintered silicon carbide, were coated with a mixture of powdered Mo and boron in stoichiometric proportions in an aqueous slurry of methyl cellulose. The rods were coated and fired in the manner of Example I. The joint, of $Mo_2B_5$, formed in situ was tested by mechanical shock and found to be structurally strong.

It will be appreciated that the present invention is not limited to the specific details given in the examples and illustrated in the specification and that various modifications may be made by one of ordinary skill in the art without departing from the spirit and scope of the invention.

What is claimed is:

1. A method of joining separate silicon carbide components to form a composite article comprising the steps of:
   (a) coating the face of at least one of the components to be joined with molybdenum boride having the formula $Mo_2B_5$,
   (b) pressing the surfaces to be joined together, and
   (c) firing to produce a composite sintered article.

2. The method of claim 1 wherein the coating in step (a) is from about 0.08 to about 0.15 mm thick.

3. The method of claim 1 wherein the $Mo_2B_5$ is formed in situ from powdered boron and powdered molybdenum metal.

4. The method of claim 1 wherein the $Mo_2B_5$ is dispersed in a temporary binder selected from the group of waxes, thermoplastic resins, gums, polyvinyl alcohols, methyl cellulose, thermosetting resins or mixtures thereof.

5. The method of claim 4 wherein the temporary binder is methyl cellulose.

6. The method of claim 4 wherein the temporary binder mixture contains between about 50 and 90 percent by weight $Mo_2B_5$.

7. The method of claim 1 wherein the $Mo_2B_5$ is formed in situ.

8. The method of claim 7 wherein the $Mo_2B_5$ is formed in situ from powdered boron and powdered molybdenum hydride.

9. The method of claim 7 wherein the $Mo_2B_5$ is formed from powdered boron, powdered molybdenum oxide and a carbon source.

10. The method of claim 9 wherein the carbon source is a phenolic resin.

11. A method of joining separate metal carbide components to form a composite article comprising the steps of:
    (a) coating the face of at least one of the components to be joined with a metal boride selected from the group of $Mo_2B_5$, $MoB_2$, $TiB_2$, $GeB_2$, $ZrB_2$, $SmB_6$, $NbB_2$, $HfB$, $VB_2$, $TaB_2$ and mixtures thereof,
    (b) pressing the surfaces to be joined together, and
    (c) firing to produce a composite sintered article; wherein the components to be joined are in sintered form and the firing is carried out at a temperature less than, but within 150° C. of, the sintering temperature of the metal carbide.

12. The method of claim 11 wherein the metal carbide is silicon carbide.

13. The method of claim 12 wherein the metal boride is $Mo_2B_5$.

14. A method of joining separate metal carbide components to form a composite article comprising the steps of:
    (a) coating the face of at least one of the components to be joined with a metal boride selected from the group of $Mo_2B_5$, $MoB_2$, $TiB_2$, $GeB_2$, $ZrB_2$, $SmB_6$, $NbB_2$, $HfB$, $VB_2$, $TaB_2$ and mixtures thereof,
    (b) pressing the surfaces to be joined together, and
    (c) firing to produce a composite sintered article; wherein at least one of said components to be joined is comprised of unsintered metal carbide and the firing step is carried out at the sintering temperature for said metal carbide.

15. The method of claim 14 wherein the metal carbide is silicon carbide.

16. The method of claim 15 wherein the metal boride is $Mo_2B_5$.

* * * * *